May 17, 1960  D. A. WALSH  2,937,064
EVENTS RECORDER

Filed May 29, 1958  2 Sheets-Sheet 1

INVENTOR
DAVID A. WALSH
BY Keith Misegades
ATTORNEY

May 17, 1960     D. A. WALSH     2,937,064
EVENTS RECORDER
Filed May 29, 1958     2 Sheets-Sheet 2
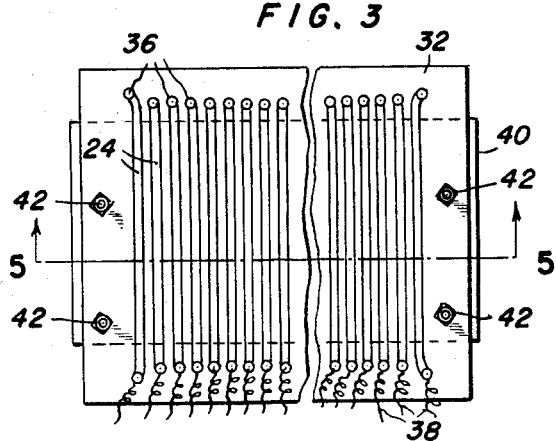
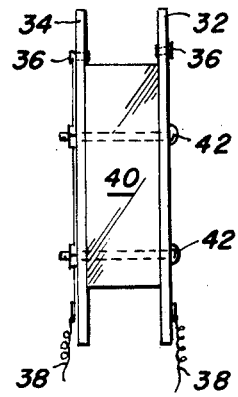
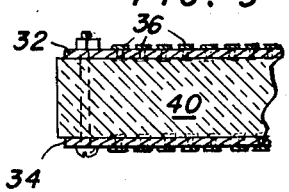
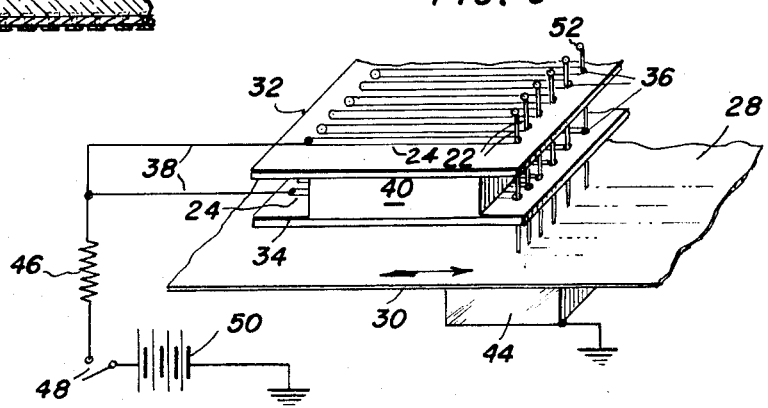
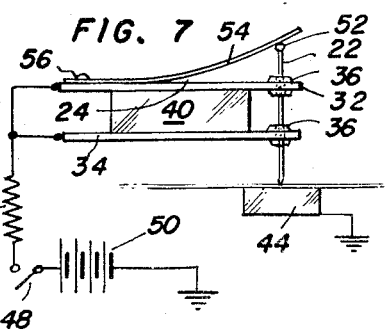
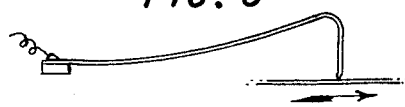
INVENTOR
DAVID A. WALSH
BY Keith Misegades
ATTORNEY

United States Patent Office 2,937,064
Patented May 17, 1960

2,937,064

EVENTS RECORDER

David A. Walsh, Takoma Park, Md.

Application May 29, 1958, Serial No. 771,689

7 Claims. (Cl. 346—74)

This invention relates to an events recorder and more particularly to a novel transcribing head for the type of events recorder employing electro sensitive roll paper.

When it is desired to maintain simultaneously a permanent record of the occurrence or non-occurrence of a number of events or operations, resort is ordinarily had to an apparatus called an events recorder employing a clock driven or motor driven roll chart for marking upon. The clock or motor mechanism of the recorder drives a chart on a level surface underneath one or more stationary marking styli, each of which when activated in some manner makes a mark upon the roll paper depending in length upon the length of time of activation. A time scale may be provided along one edge of the roll paper for a reference as to time and length of time of the occurrence so recorded. The styli might be manually operated or solenoid operated pencils or other marking means but are more commonly electrically conductive metal wire fingers or quills secured to a block at one end and bearing upon electro sensitive roll paper at the bent end thereof. In this type of recorder, a source of electrical potential is connected to one of the marking fingers, the finger then burning the electro sensitive paper, otherwise grounded, which passes beneath it, making a permanent record of the time interval during which the said finger was energized. The present invention is concerned with an improvement in the recording styli employed with electro sensitive paper event recorders.

It has been found that when bent wire finger recording styli are employed in an events recorder, a limited number of such styli may be accommodated across the width of a standard six-inch recorder chart, thus limiting the number of marking channels or events that can be recorded on the chart. Also, there is inevitable side play in the recording fingers and eventual bending of the fingers sidewise into one another as the machine is continually used. Further, the styli are somewhat expensive and tedius to replace either when they are replaced due to having bent out of shape, insufficient tension, or dullness of the stylus point.

Accordingly, an object of this invention is to provide an improved recording head for an events recorder providing an increased number of recording channels across the face of the chart.

It is another object of this invention to provide an improved recording head for an events recorder employing easily accessible and easily replaceable recording styli.

It is a further object of this invention to provide an improved recording head for an events recorder employing a multiplicity of very closely spaced recording styli.

It is another object of this invention to provide an improved recording head for an events recorder employing styli to which no permanent physical or electrical connection is made.

In accordance with the invention there is provided in an events recorder a recording head comprising a pair of parallel insulating plates through each of which is secured a multiplicity of metal eyelets or other conducting annuli, these eyelets through each of the plates being substantially identical and in alignment each with a corresponding eyelet on the other plate. A straight metal needle which may be weighted upon its head is slidably supported through corresponding eyelets or annuli in each of the aforementioned plates, the plates holding the needle in generally vertical alignment to bear upon a roll of electro sensitive paper which passes beneath the parallel plates. Electrical connection is made to a corresponding pair of eyelets or annuli in each of the plates preferably by means of printed or etched lines upon the nonconductive plates leading from the eyelets or annuli to the rear edges of the plates. Wiring connects these lines to a common terminal at the rear of the recorder. A parallel circuit is thus completed by means of the aforementioned lines to both the upper eyelet and the lower eyelet supporting the needle so that electrical connection will be completed at all times to the needle at least through one of the eyelets. The terminal at the rear of the recorder is connected to a source of voltage selectively operable by whatever apparatus the operation of which it is desired to record. Because of the small diameter of the needles and the closeness with which eyelets necessary to accommodate them may be placed, it is possible to place from eighty to two hundred such styli across a recording head employed with a six-inch electro sensitive recording chart, thus providing a greatly increased number of recording channels than heretofore attainable. The number heretofore employed has been approximately sixty or less.

If desired, a flat cover spring which may be constructed of nonconductive material may be brought to bear upon the tops of the aforesaid needles to provide increased tension thereon.

The invention will be more particularly described with reference to the drawings in which:

Figure 3 is a top view of a recording head according to the present invention with the styli removed.

Figure 4 is a side view of the recording head.

Figure 5 is a section view of the recording head taken at section 5—5 in Figure 3.

Figure 6 is a cut-away perspective view showing the operation of a recording head according to the present invention with the styli in place bearing upon electro sensitive recording paper.

Figure 7 is a modification of the present invention employing tension on the recording styli.

Figure 8 illustrates finger styli of the prior art.

Figure 1:
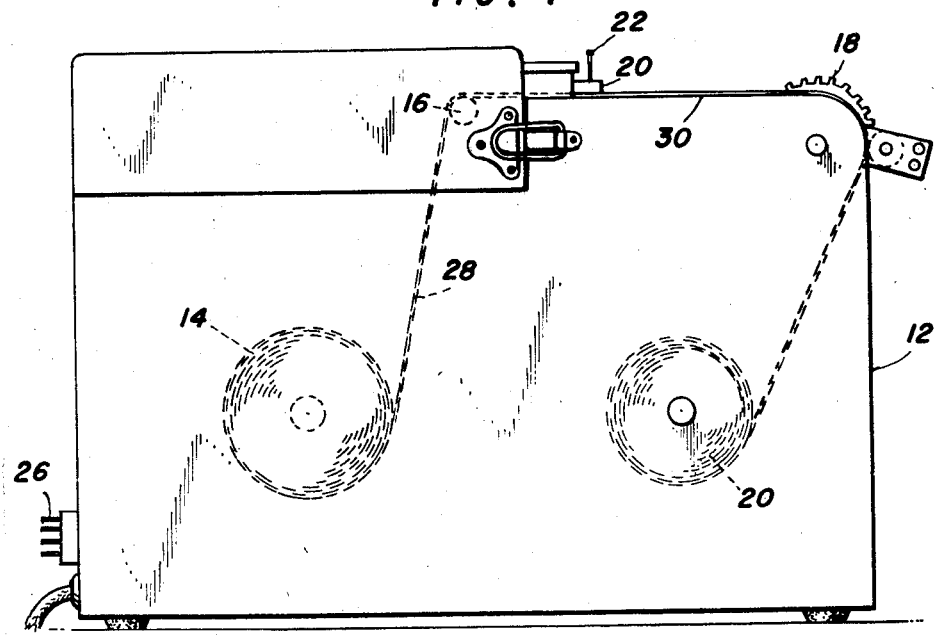
Figure 1 is a generalized side view of a recorder employing the recording head of the present invention.
Figure 2:
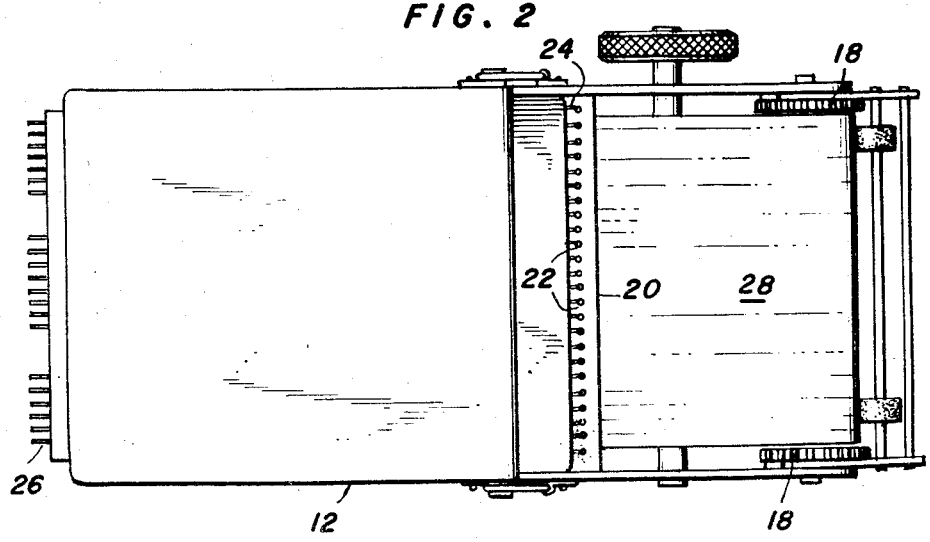
Figure 2 is a top view of the recorder.

Referring to Figures 1 and 2, recorder, 12, employing a roll of electro sensitive breakdown paper, 14, idler, 16 capstan, 18, and take-up roll, 20, is illustrated herein to facilitate explanation of the present invention shown generally as recording head, 20, supporting weighted needles, 22. It is understood that while a limited number of recording needles are shown in the drawing, the actual number employed is limited only by the voltage breakdown spacing of eyelets in the insulating plates supporting the needles. Each needle is electrically connected by means of etched or printed wiring, 24, and other internal wiring to one of the electrical connector terminals, 26, at the base of the recorder. The electro sensitive paper, 28, utilized in the present recorder is of the type commonly employed in the art which is conductive upon the bottom side thereof, 30, providing a ground from the said conductive paper to the base of the machine. When a proper voltage is applied to one of the needles, 22, on the order of 200 volts, the recording paper breaks down or burns at the point where the stylus meets the paper, thus providing a continuous burnt line as the paper moves from under the pin and as long as the pin remains thus energized.

Referring to Figures 3, 4, and 5, there are shown top, side, and section views respectively of the recording head according to the present invention, employing a pair of plastic or other insulating type parallel plates, 32 and 34, having secured therein a multiplicity of metal eyelets or rivets, 36. Pairs of eyelets, 36, are axially aligned relative to one another on each of the two plates and are just large enough in diameter to provide a loose fit for the recording needles, 22. Etched wires are printed upon each of the plates, 32 and 34, and are shown generally at 24. These etched wires proceed from the aforementioned eyelets to the rear edge of the plates, 32 and 34, terminating in conductors, 38, which in turn connect to the electrical plug at the back of the recorder. A plastic block or other type of insulating block, 40, secured to plates 32 and 34 by bolts, 42, is employed to separate the two plates and maintain them in aligned and parallel orientation.

Figure 6 is a perspective view of the recording head according to the present invention employing parallel plates, 32 and 34, having eyelets, 36, secured therein, and having etched wires, 24, imprinted thereon and extending from the aforementioned eyelets to electrical conductors, 38, at the rear of the recording head. Recording needles, 22, are supported through eyelets, 36, and rests upon the electro sensitive recording paper, 28, which in turn is passed over grounding block, 44, which connects with the conductive underside, 30, of recording paper, 28. Resistor, 46, is employed to limit current to the recording needle. Switching means, 48, is external to the present recording device and is operable by the external apparatus, the time of operation of which is desired to record. The closing of switch 48 energizes the circuit to the illustrated needle, 22, of the recording head by supplying potential from battery 50.

In operation, when it is desired to record upon the paper, the switch, 48, which represents any circuit closing means operated by the event which it is desired to record, is closed completing a circuit through ground to battery, 50, switch, 48, current limiting resistor, 46, parallel wires, 38, etched wiring, 24, and needle, 22, to the recording paper, 28. The potential of battery 50 is chosen such that it will be sufficient to initially break down the electrically sensitive paper, 28, and complete the circuit to the conductive coating, 30, on the back of paper, 28, to grounding block, 44. Resistor, 46, is chosen such that current will be limited to a value that will not unduly load the battery or the present apparatus and at the same time will not drop the voltage of battery 50 to an amount insufficient to facilitate continued breakdown of paper 28. As the paper travels from under the needle, 22, a mark will or will not be made on the paper according to whether switching means, 48, is closed.

The needles employed as styli to enscribe upon electro sensitive paper, 28, in the present invention may have weighted heads, 52, if it is desired to bring increased pressure to bear upon the paper for better contact therewith. Such weighted heads may be procured by dipping the heads of metal needles in a lead or plastic solution before inserting the same in the recorder. Otherwise, ordinary straight metal needles or other straight pointed conductive shafts may be employed as styli, 22, in the present invention. While the needles are shown oriented vertically, it is appreciated that the pointed ends thereof may be slanted toward the direction of paper travel if desired.

Figure 7 is a modification of the present invention which employs a flat spring member, 54, secured to plate 32 at point 56 remote from eyelets 36 and brought to bear at the head of needle 22, in order to supply increased pressure to the needle, 22, when it is found with the particular paper that increased pressure is necessary. The said flat spring may be individual for each and every needle, 22, in which case it may be of a metallic material connecting to etched wire 24 beneath it, or it may be of a plastic material and be common to a number of needles, 22. This spring member, 54, is preferably removably secured to plate 32 at point 56 so that it may be swung back for removal of needles 22.

Figure 8 is illustrative of the prior art showing a side view of the finger type stylus heretofore employed in events recorders which use electro sensitive paper. A plurality of these secured fingers were employed in prior art machines across the face of the recording paper. The end of the finger generally toward the point wobbled laterally (into and out of the paper in the illustration), causing interference between fingers.

It is thus seen that the present invention provides an economical recording head for an events recorder which facilitates a greatly increased number of channels on the recording paper. While the recording styli are not rigidly held and may be readily removed and replaced, they are secured against material lateral movement and thus will not bend into the next recording track or short out the next adjoining stylus.

The particular embodiment of the invention set out is to be taken as illustrative of the invention and not in a limiting sense.

What is claimed is:

1. In an events recorder employing moving roll paper, sensitive to changes in energy level, transcribing means including, a plurality of straight metallic styli for bearing upon the paper, a plurality of conductive bearings, one for each stylus, in conductive relation thereto, insulation separating the respective bearings, one from each other, each said bearing supporting its respective stylus for vertical movement through said bearing and means for selectively altering the level of energy supplied to said bearing and thence to the corresponding styli.

2. In an events recorder employing moving electrosensitive roll paper, a transcribing device comprising, a plurality of generally vertical weighted metal styli, a plate of insulating material including therethrough a plurality of metal bearings for slidably receiving said styli in a vertical direction without permitting substantial horizontal movement, said styli resting upon said roll paper, and means for raising the electrical potential of said styli with respect to said roll paper.

3. In an events recorder employing a moving web of electro-sensitive roll paper, an improved marking mechanism comprising, a pair of non-conducting plates each having an identical set of annular apertures therethrough in a common direction, means securing said plates in a fixed parallel relation for axially aligning pairs of said apertures above said web of paper, a plurality of weighted metal styli smaller in diameter than said apertures and each extending through an aperture in each of said plates to rest upon said web of paper, and circuit means for selectively applying an electrical potential to various of said styli with respect to said paper.

4. The apparatus as recited in claim 3, additionally having means to yieldably constrain the tops of said styli in a downward direction towards said paper.

5. In an events recorder employing a moving web of electro-sensitive paper, an improved recording head comprising a generally vertical weighted solid metal stylus bearing upon said paper, a first metal eyelet loosely receiving said stylus above said paper, a second metal eyelet axially aligned with said first eyelet and receiving said stylus above said first eyelet, and means for providing electrical potential to both said eyelets in parallel to raise the electrical potential of said stylus.

6. In an events recorder employing a moving web of electro-sensitive roll paper, a marking mechanism disposed above said roll paper comprising, a pair of insulating plates having identical sets of annular openings therein, each set disposed in a row across the length of said plates, each said annular opening being lined at the inner surface thereof with electro-conductive material, a separating block of insulating material secured to each of said plates remote from said annular openings, said block securing said plates with their annular openings in axial alignment, straight metal styli each extending through one of said aligned openings in each of said plates and resting on said paper, said styli having diameters slightly less than said annular openings, plural conductive means deposited upon said plates and extending from the electro-conductive material in said annular openings to edges of said plates to provide a separate electrical connection from each of said annular openings to edges of said plates, and circuit means for applying electrical potential in parallel to pairs of said conductive means associated with a particular stylus for raising the electrical potential of the stylus.

7. The apparatus as recited in claim 6 additionally having means yieldably constraining said styli against said paper.

References Cited in the file of this patent

UNITED STATES PATENTS

| | | |
|---|---|---|
| 137,676 | Guebhard et al. | Apr. 8, 1873 |
| 1,438,829 | Howell | Dec. 12, 1922 |
| 2,607,654 | Ridings et al. | Aug. 19, 1952 |

FOREIGN PATENTS

| | | |
|---|---|---|
| 787,544 | Great Britain | Dec. 11, 1957 |